US009176539B2

(12) United States Patent
Tapley et al.

(10) Patent No.: US 9,176,539 B2
(45) Date of Patent: Nov. 3, 2015

(54) KEY INPUT USING AN ACTIVE PIXEL CAMERA

(71) Applicants: John Tapley, Santa Clara, CA (US); Eric J. Farraro, San Jose, CA (US); Nate Lyman, Livermore, CA (US)

(72) Inventors: John Tapley, Santa Clara, CA (US); Eric J. Farraro, San Jose, CA (US); Nate Lyman, Livermore, CA (US)

(73) Assignee: eBay Inc., San Jose, CA (US)

( * ) Notice: Subject to any disclaimer, the term of this patent is extended or adjusted under 35 U.S.C. 154(b) by 43 days.

(21) Appl. No.: 13/674,004

(22) Filed: Nov. 10, 2012

(65) Prior Publication Data

US 2014/0132564 A1 May 15, 2014

(51) Int. Cl.
*G09G 5/00* (2006.01)
*G06F 1/16* (2006.01)
*G06F 3/042* (2006.01)

(52) U.S. Cl.
CPC ............ *G06F 1/1686* (2013.01); *G06F 3/0425* (2013.01)

(58) Field of Classification Search
None
See application file for complete search history.

(56) References Cited

U.S. PATENT DOCUMENTS

| 6,057,540 | A * | 5/2000 | Gordon et al. | 250/221 |
| 7,057,645 | B1 | 6/2006 | Hara et al. | |
| 2006/0132435 | A1 * | 6/2006 | Machida | 345/157 |
| 2009/0102788 | A1 * | 4/2009 | Nishida et al. | 345/158 |
| 2010/0079413 | A1 * | 4/2010 | Kawashima et al. | 345/175 |
| 2011/0239166 | A1 * | 9/2011 | Choi | 715/863 |
| 2011/0254864 | A1 * | 10/2011 | Tsuchikawa et al. | 345/660 |
| 2012/0092283 | A1 * | 4/2012 | Miyazaki | 345/173 |

FOREIGN PATENT DOCUMENTS

| WO | WO-2014074811 A2 | 5/2014 |
| WO | WO-2014074811 A3 | 5/2014 |

OTHER PUBLICATIONS

"International Application Serial No. PCT/US2013/069131, International Preliminary Report on Patentability mailed May 21, 2015", 7 pgs.
"International Application Serial No. PCT/US2013/069131, International Search Report mailed May 7, 2014", 2 pgs.
"International Application Serial No. PCT/US2013/069131, Written Opinion mailed May 7, 2014", 5 pgs.
Hackenberg, Georg, et al., "Lightweight Palm and Finger Tracking for Real-Time 3D Gesture Control", 2011 IEEE Virtual Reality Conference, [Online]. Retrieved from the Internet: <http://ieeexplore.ieee.org/xpl/login.jsp?tp=&arnumber=5759431, (Mar. 2011), 19,26.

(Continued)

*Primary Examiner* — Adam R Giesy
(74) *Attorney, Agent, or Firm* — Schwegman Lundberg & Woessner, P.A.

(57) ABSTRACT

In an example embodiment, an active pixel sensor on a user device is utilized to capture graphical user interface navigation related movements by a user. Areas of low luminance can be identified and movements or alterations in the areas of low luminance can be translated into navigation commands fed to an application running on the user device.

20 Claims, 20 Drawing Sheets

(56) References Cited

OTHER PUBLICATIONS

Irie, Kota, et al., "Construction of an Intelligent Room Based on Gesture Recognition", Proceedings of 2004 IEEE/RSJ International Conference on Intelligent Robots and Systems; vol. 1, [Online]. Retrieved from the Internet: <http://ieeexplore.ieee.org/xpl/login.jsp?tp=&arnumber=1389351>, (Oct. 2, 2004), 193-198.

Wong, Shu-Fai, et al., "Real-time Interpretation of Hand Motions using a Sparse Bayesian Classifier on Motion Gradient Orientation Images", Proceedings of the British machine Vision Conference, [Online]. Retrieved from the Internet: <http://cms.brookes.ac.uk/staff/PhilipTorr/BMVC2005/papers/117/paper117.pdf>, (Sep. 2005), 379-388.

\* cited by examiner

KEY INPUT USING AN ACTIVE PIXEL CAMERA

BACKGROUND

With the rise in popularity of touchscreen displays, especially in mobile products, it is increasingly unlikely that user devices will contain many (if any) buttons or other controllers capable of providing additional user input beyond the user input captured by the touchscreen display. Most modern smartphones, for example, may have only buttons for powering on or of the device, volume controls, and perhaps a "home" button designed to allow the user to quickly exit an application and return to a home screen. None of these buttons are typically useful for providing user input to applications, as their default inputs are typically still needed no matter the application (e.g., it is difficult for an application to use the volume buttons as input as the system still needs to control the system volume using those buttons). While touchscreens certainly allow for a variety of different user inputs, such inputs are limited to the areas which the touchscreen covers, which is a portion of the front of the mobile device. This can be limiting in input-heavy applications, such as games, where a user's hands may get cramped or the user may otherwise find it difficult to control the game via only the front touchscreen. While some applications have been designed to use an accelerometer in a mobile device as an additional user input (e.g., the user could "turn" the mobile device and thereby cause a "turning" user input to, for example, a driving game), there is a need for additional improvements in providing user input beyond the touchscreen or dedicated buttons.

BRIEF DESCRIPTION OF DRAWINGS

Some embodiments are illustrated by way of example and no limitation in the figures of the accompanying drawings in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Although the present embodiments have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense.

In an example embodiment, an active pixel sensor, such as a camera, embedded in a device can be used as an additional input device (beyond its use in capturing images as a camera). In a specific embodiment, a user may place a finger over the active pixel sensor, and the sensor may be designed to detect movement, placement, and/or orientation of the finger and translate such information into user input to be fed to an application.

In one example embodiment, the active pixel sensor is located on a user device running an auction application. This application may be, for example, an application that aids users in listing items for sale in an online auction or other marketplace, or one that aids users in searching for and bidding on/buying items in an online auction or marketplace. As such, the user device may act as a client machine in a larger network based system.

Figure 1:
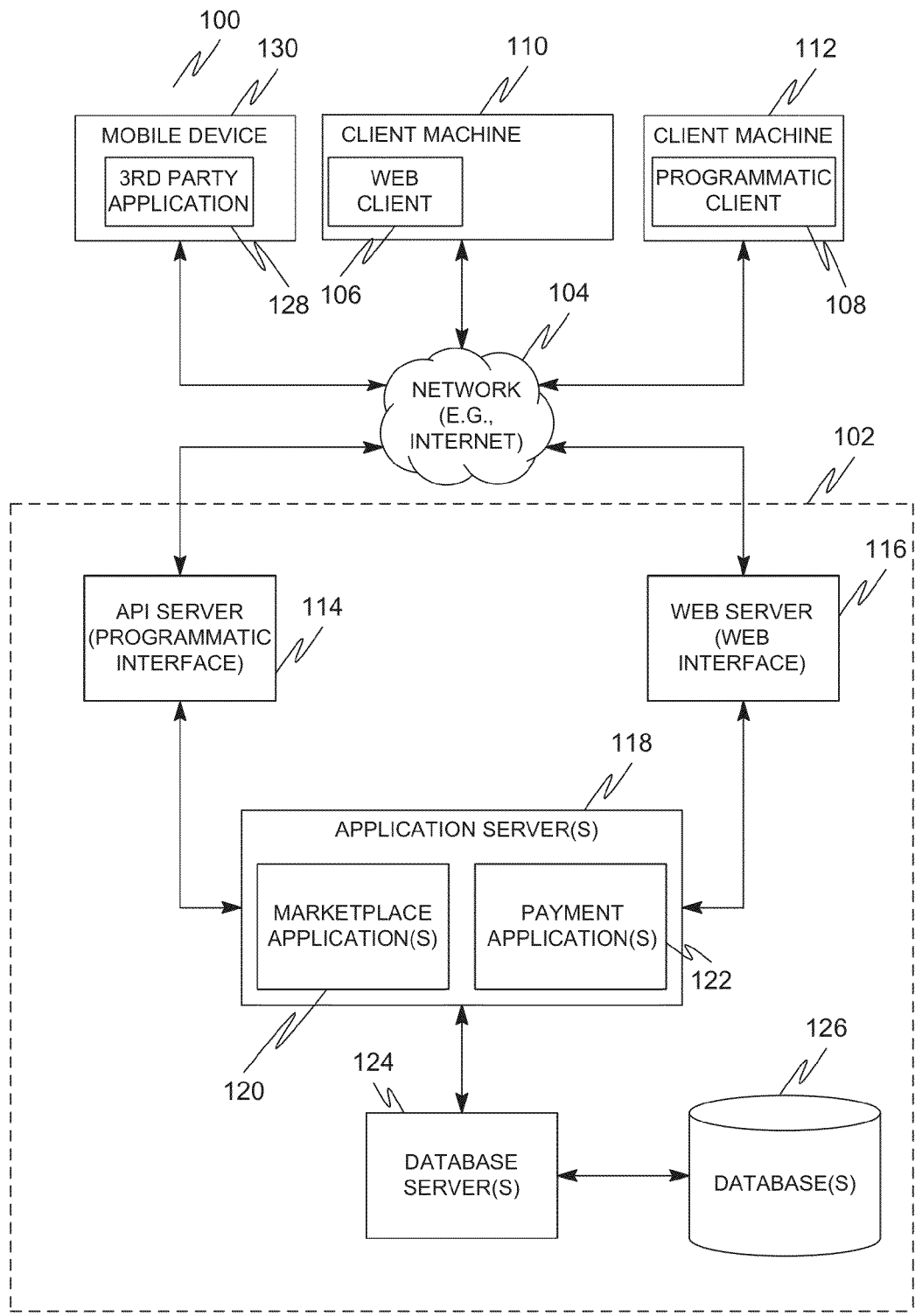
FIG. 1 is a network diagram depicting a networked or network based system, according to an example embodiment, having a client-server architecture configured for exchanging data over a network.

FIG. 1 is a network diagram depicting a networked or network based system, according to an example embodiment, having a client-server architecture configured for exchanging data over a network. For example, the network system 100 may include a network-based publisher 102 where clients may communicate and exchange data within the network system 100. The data may pertain to various fractions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user reputation values; user profiles; user attributes; product and service reviews and information, such as pricing and descriptive information; product, service, manufacture, and vendor recommendations and identifiers;

product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 1110 using a web client 106. The web client 106 may be in communication with the network-based publisher 102 via a web server 116. The UIs may also be associated with a client machine 112 using a programmatic client 108, such as a client application, or a third party server or a mobile device 130 hosting a third party application 128. It can be appreciated in various embodiments the client machine 110, 112, or third party application 128 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

A mobile device 130 may also be in communication with the network-based publisher 102 via a web server 116. The mobile device 130 may include a portable electronic device providing at least some of the functionalities of the client machines 110 and 12. The mobile device 130 may include a third party application 128 (or a web client 106) configured to communicate with application server 114. Although only one mobile device 130 is shown, it will be appreciated that in practice there may be many mobile devices 130. That is, as used herein, the term "mobile device 130" may include plural mobile devices 130, depending on context. In some instances herein, the mobile device 130 may be referred to as a "user device." Further, as is well known in the art, the mobile devices 130, and non-mobile devices as well, may be in contact with a GPS (global positioning system) or other suitable technology for determining the location of such devices and the incentives may be based on both the number of mobile devices 130 and non-mobile devices within the geographic locale.

Turning specifically to the network-based publisher 102, an application program interface (API) server 114 and a web server 116 are coupled to, and provide programmatic and web interfaces respectively to, one or more application servers 118. The application servers 118 host one or more marketplace application(s) 120 and/or payment applications 120. The application servers 118 are, in turn, shown to be coupled to one or more database server(s) 124 that facilitate access to one or more database(s) 126.

In one embodiment, the web server 116 and the API server 114 communicate and receive data pertaining to listings, transactions, and feedback, among other things, via various user input tools. For example, the web server 116 may send and receive data to and from a toolbar or webpage on a browser application (e.g., web client 106) operating on a client machine (e.g., client machine 110). The API server 114 may send and receive data to and from an application (e.g., programmatic client 108 or third party application 128) running on another client machine (e.g., client machine 112 or a third party server).

FIG. 1 also illustrates a third party application 128 that may execute on a third party server and may have programmatic access to the network-based publisher 102 via the programmatic interface provided by the API server 114. For example, the third party application 128 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

The network-based publisher 102 may provide a multitude of feedback, reputation, aggregation, and listing and price-setting mechanisms whereby a user may be a seller or buyer who lists or buys goods and/or services (e.g., for sale) published by the network-based publisher 102.

Figure 2A:
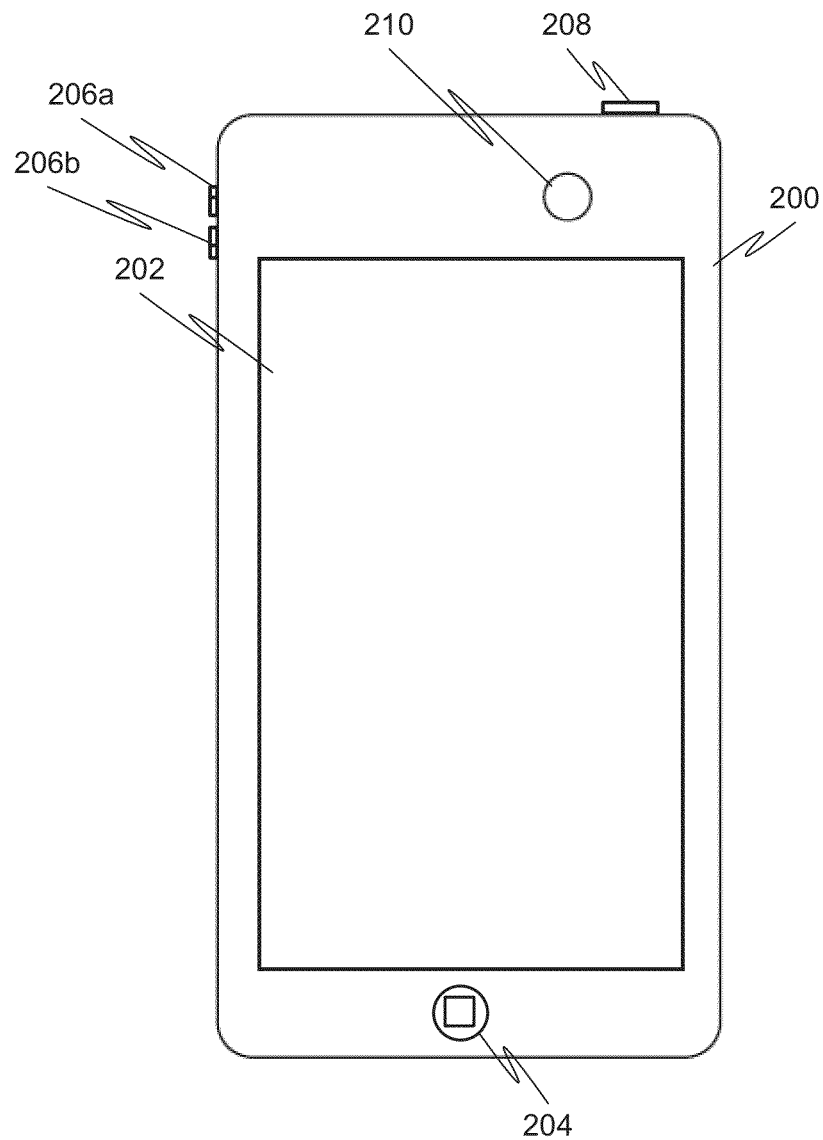
FIGS. 2A and 2B are block diagrams illustrating a user device in accordance with an example embodiment.
Figure 2B:
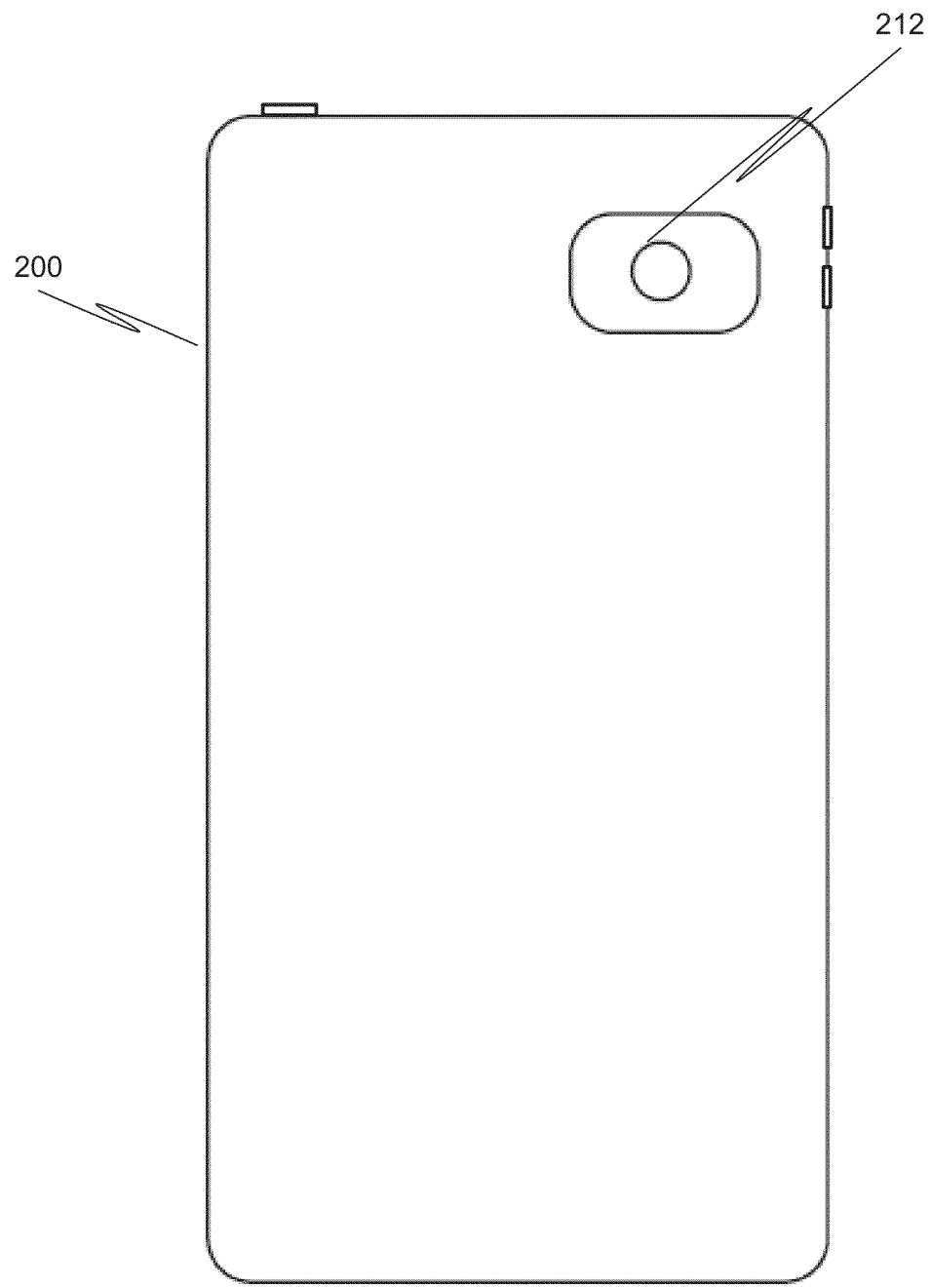

FIGS. 2A and 2B are block diagrams illustrating a user device in accordance with an example embodiment. The user device 200 depicted is a mobile device, such as a smartphone or tablet computer. FIG. 2A depicts the front of the user device 200. As can be seen, a large portion of the front of the user device 200 is comprised of a touchscreen display 202, which can act as the primary user input device for navigation-based input. Navigation-based input is user input that commands the user device 200 to move something on the display 202 (e.g., move a cursor, scroll), or to select something on the display 202 (e.g., press a button). In other words, for the purposes of this disclosure and appended claims, navigation-based input may be any input that traditionally would have been received from a navigation-based input device, such as a mouse.

The user device 200 also has several dedicated buttons 204, 206a, 206b, and 208. These dedicated buttons provide dedicated input, meaning that they are designed to perform a fixed command when utilized, and as such are unsuitable for use in additional navigation input (or, at least, beyond the context sensitive fixed command that they have been designed for). For example, button 204 may be a "home" button, which is designed to cause the user device 200 to exit any running application and return the graphical user interface to a home screen. Since this button 204 is intended to act in this manner no matter what application is being used, it is unsuitable for use as an additional navigation based input device. Buttons 206a and 206b adjust volume up or down, and also are intended to act in this manner no matter what application is being used. Button 208 is a power button, intended to power the display and/or device off, and also is intended to act in this manner no matter what application is being used.

Also present on the front of the user device 200 is an active-pixel sensor 210 (e.g., a camera). This front facing active-pixel sensor 210 is often used for video-based calling or other camera or video applications where it is desired to capture images of the user him or herself. A rear-facing active pixel sensor, which is described later, is often used for camera or video applications when it is desired to capture images of something other than the user him or herself.

FIG. 2B depicts the back of the user device 200. As can be seen, the aforementioned rear-facing active pixel sensor 212 is present on the back of the user device 200. Coincidentally, it is also often placed near to where a user will traditionally place one or more fingers while holding the user device 200.

In an example embodiment, one or more active pixel sensors (e.g., 210, 212) on a user device 200 are used for navigation-based input. It should be noted that the user device 200 may have any number of such active pixel sensors, and it is not necessary that the system be designed such that every one of them be capable of providing navigation-based input. For example, the system may be designed so that only a rear-facing active pixel sensor 212 provides navigation-based input, while a front-facing active pixel sensor 210 is never used for navigation-based input.

Figure 3A:
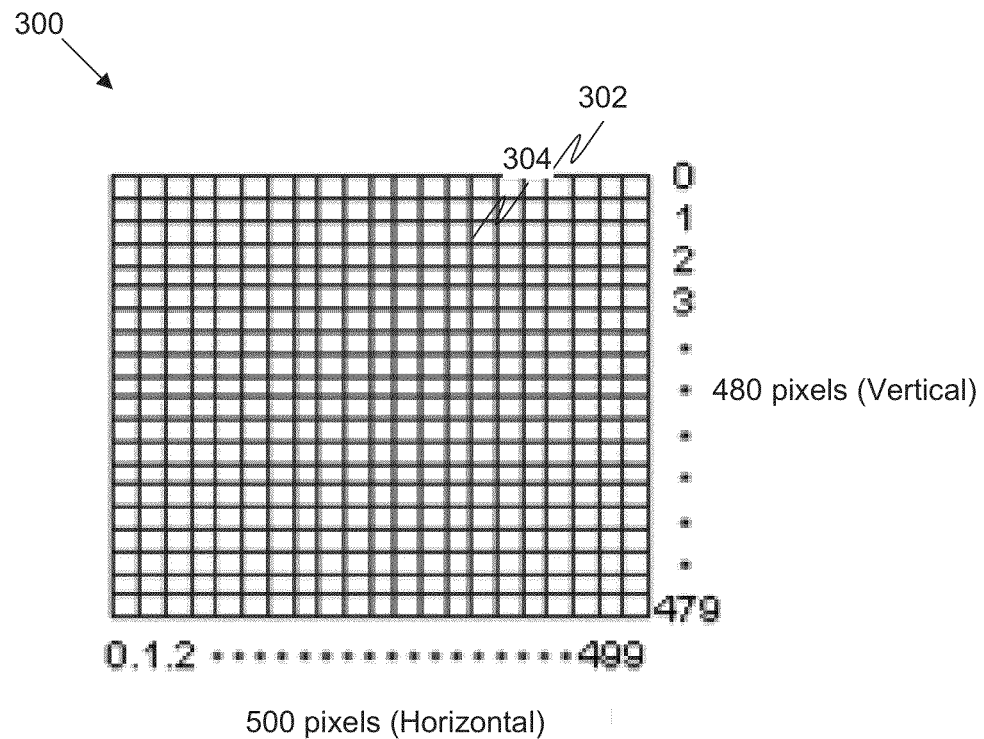
FIGS. 3A and 3B are diagrams illustrating an active pixel sensor in accordance with an example embodiment.
Figure 3B:
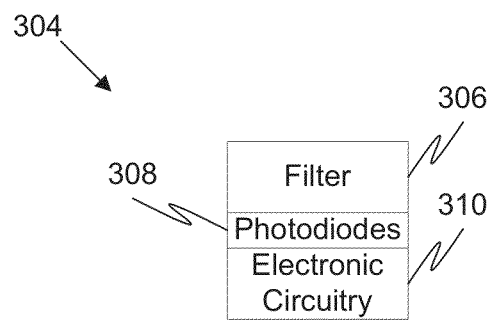

FIGS. 3A and 3B are diagrams illustrating an active pixel sensor in accordance with an example embodiment. This diagram depicts a Complementary Metal Oxide Semiconductor (CMOS) image sensor, which has low power consumption, high read-out speed, and small size. Other types of active pixel sensors, however, could be utilized, such as Charge-Couple Device (CCD) image sensors.

As can be seen in FIG. 3A, which is a top view, the active pixel sensor 300 comprises a number of pixels, also known as a pixel array 302. It should be noted that while the pixel array 302 in this example is depicted as a 500×480 array, different dimensions can be used for the pixel array 302.

Referring to FIG. 3B, which is a side view, each pixel 304 in the pixel array 302 may be covered by one or more color filters, including, for example, a red, green, and blue light filter (here simply depicted as a generic single color filter 306). Photodiodes 308 are set under the filter(s) 306 to detect light signals, and then electronic circuitry 310 amplifies and reads the electrical signal generated by the photodiodes 308.

Figure 4:
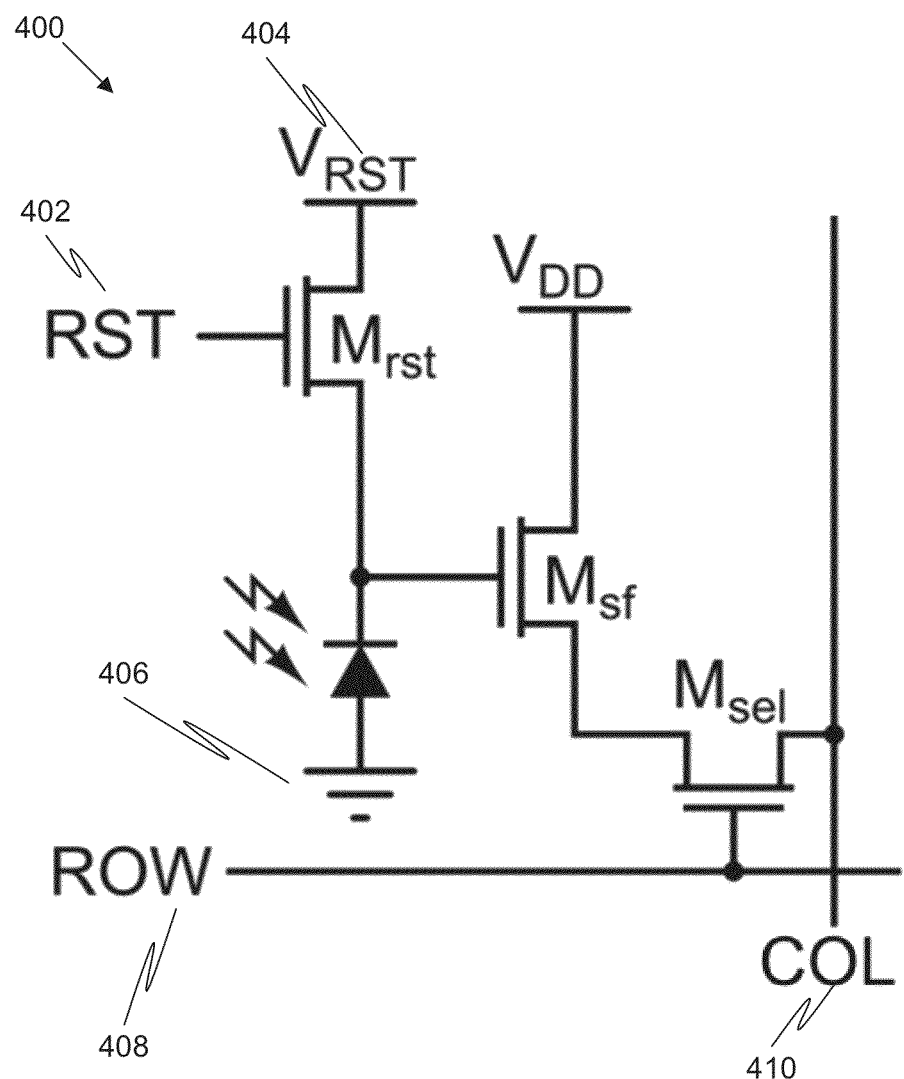
FIG. 4 is a diagram illustrating a three transistor pixel circuit accordance with an example embodiment.

FIG. 4 is a diagram illustrating a three transistor pixel circuit in accordance with an example embodiment. This three transistor pixel circuit can be used as the electronic circuitry 310 for each pixel 304 in the pixel array 302 of FIG. 3. Each pixel 304's electronic circuitry 400 gets a controller 402, a reset voltage 404, an amplification voltage 406, a row controller 408, and as column detector 410. The circuit operates as follows. When the device is in darkness, the photodiode 308 is off, and as such only an ignorable dark current can flow through it. The controller 402 is then turned on and off, making the voltage on the upper end of the photodiode 308 to be the reset voltage 404, which means no signal. If light is then detected, part of the charge accumulated on the upper end of the photodiode 308 leaks to the ground and makes the voltage decrease. Depending on the intensity of the incident light, the voltage on the upper end of the photodiode 308 becomes different, causing the resistance $M_{sf}$ to become different. Then the row controller 408 is turned on, and a current is detected on the column detector 410. The different resistance of $M_{sf}$ gives a different current, which indicate a different light power.

In an example embodiment, directional light differences in an active pixel sensor 300 can be used to determine the position of a finger being placed over the active pixel sensor 300 on a user device. From the position, input events can be assigned to a listening entity. When the active pixel sensor 300 is located on the back of a mobile device, it also can be placed in a position where the user's finger or fingers would ordinarily fall when holding the device, allowing for easy reach for the user. Additionally, unlike some other potential solutions to add additional navigational inputs (such as placing a second touchscreen controller on the back of the device), the active pixel sensor 300 often will have a different feel than the surrounding materials, and as such the user can detect the tactile difference between the active pixel sensor 300 and the surrounding material, and thus is able to determine the boundaries of the active pixel sensor 300 and thus orient his or her finger appropriately to cause the proper navigation input to the device, despite not being able to see his or her finger because it is hidden behind the user device 200.

In an example embodiment, the entire image from the active pixel sensor 300 is converted to grayscale. The darkest regions of the grayscale image then have the most coverage of the finger. As the position of the finger changes due to tile, rotation, or movement, lighter regions emerge, indicating a directional shift. When the active pixel sensor 300 is located on the back side of the device, an inverse direction can be applied as input.

In some embodiments the process of detecting navigation-based input using an active pixel sensor 300 may be initially calibrated when the user places his or her finger over the active pixel sensor 300. The beginning position of the finger can be used as a reference point to then determine subsequent movement of the finger. In such embodiments, the user may be guided by on-screen prompts indicating that the user should place the finger over the sensor 300 for calibration, after which the system could either automatically, or upon selection by the user (such as by pressing an area of the touchscreen with a finger from a different hand, or a voice command), begin the calibration process.

Figure 5A:
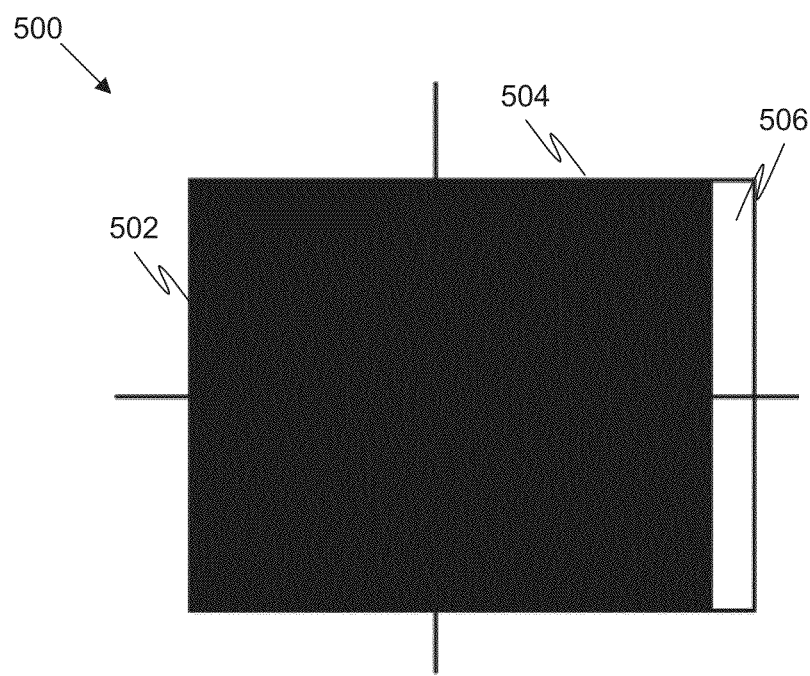
FIGS. 5A-5D are diagrams illustrating the detection of movement in an active pixel sensor in accordance with an example embodiment.
Figure 5B:
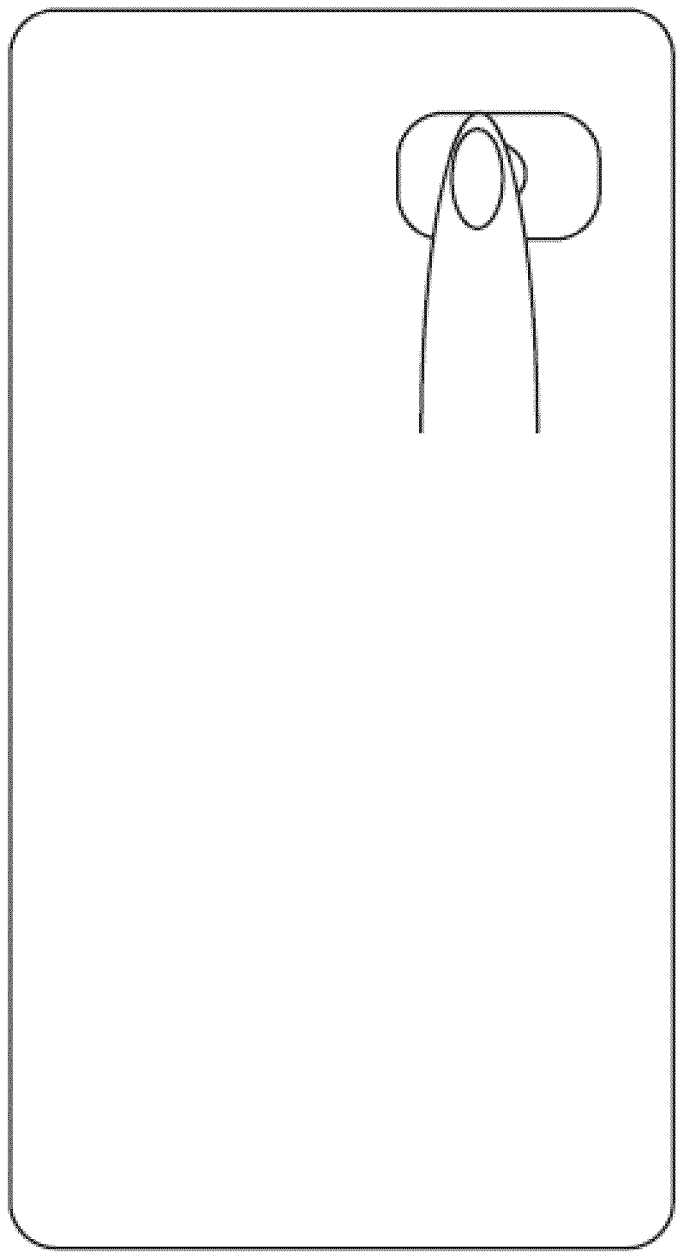
Figure 5C:
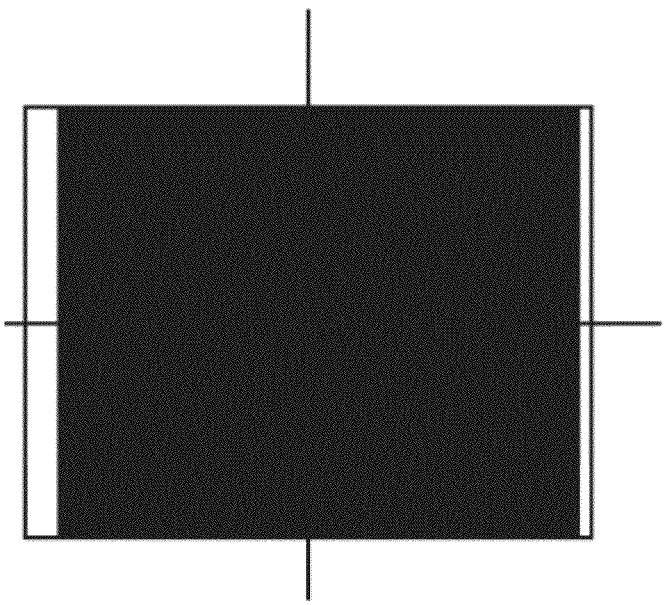
Figure 5D:
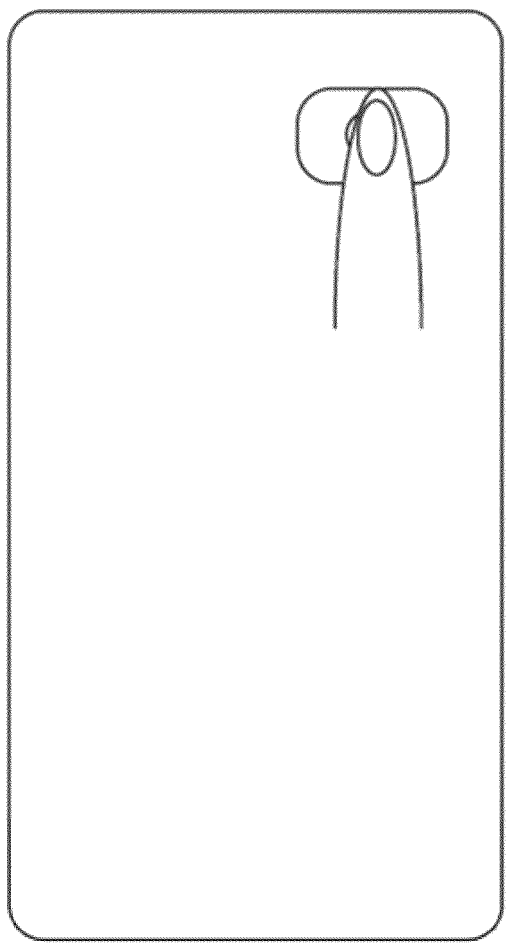

FIGS. 5A-5D are diagrams illustrating the detection of movement in an active pixel sensor 500 in accordance with an example embodiment. In FIG. 5A, it can be seen that the active pixel sensor 500 detects a dark spot 502 in the visible area 504, with a small light spot 506 on the right hand side of the visible area 504. This may indicate that the user's finger is on the left side of the active pixel sensor 500, as depicted in FIG. 5B. At some point, the user may slide his or her finger, resulting in the luminance pattern depicted in FIG. 5C. This reflects the rightward movement of the user's finger, as depicted in FIG. 5D. Corresponding movement may then be triggered in an application on the user device 200. As discussed earlier, if the active pixel sensor 500 is on the back of the user device 200, the triggered movement may be the inverse of the detected movement (e.g., the rightward movement depicted results in a leftward movement navigation command being sent to the corresponding application). In an example, the applicant can provide a configuration interface, allowing a user to determine what actions are triggers by different navigation-based inputs detected by an active pixel sensor, such as active pixel sensor 500.

Changes to the luminance in different regions can be measured at fixed intervals. For example, the active pixel sensor 500 may be examined at 15 fps intervals to determine whether the luminance has changed and in which direction it has changed.

Figure 6A:
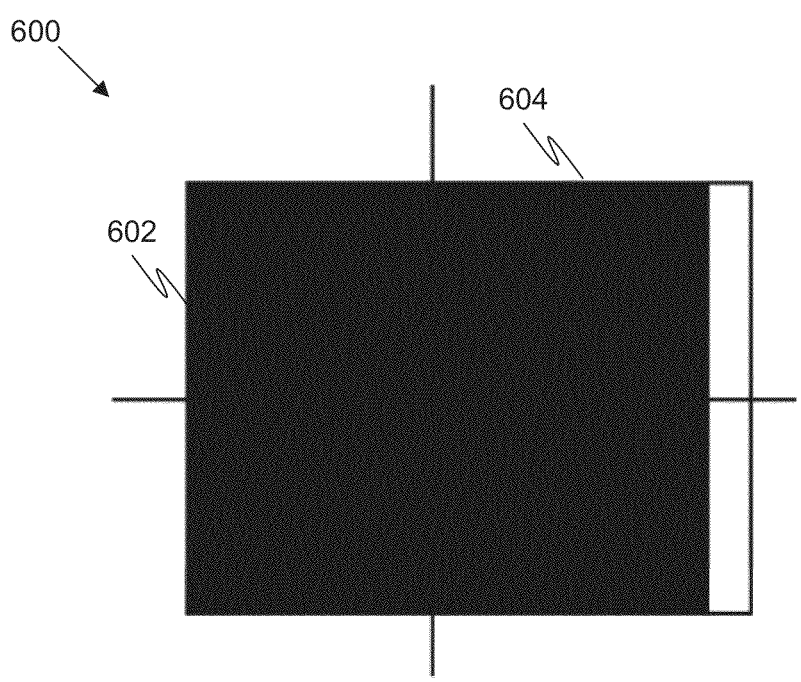
FIGS. 6A-6F are diagrams illustrating the detection of finger taps in an active pixel sensor in accordance with an example embodiment.
Figure 6B:
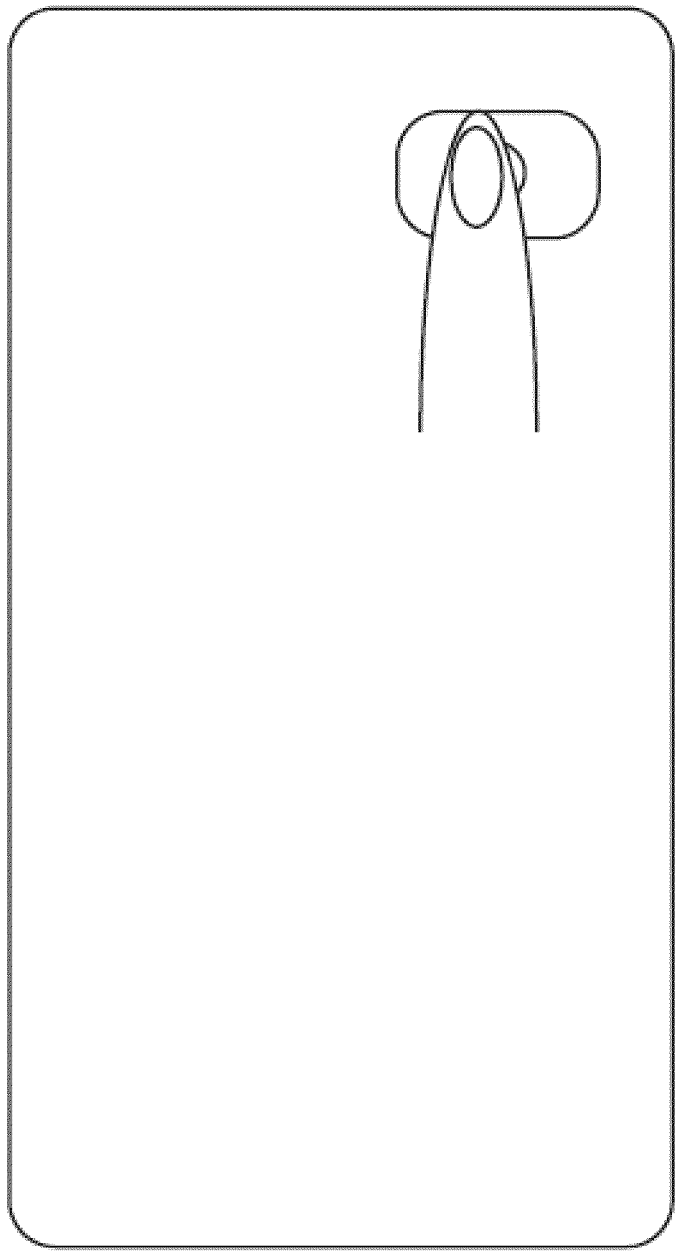

In another embodiment, rather than movement, taps may be detected on the active pixel sensor 500 by detecting when the active pixel sensor 500 as a whole is detecting an entirely or near-entirely dark region followed by that region turning light and then turning dark again. A single "tap" may actually be composed of three distinct actions or observed state changes (e.g., dark, light, dark). First, a user's finger begins by covering the active pixel sensor 500, then is removed, and then covers it again. FIGS. 6A-6F are diagrams illustrating the detection of finger taps in an active pixel sensor 600 in accordance with an example embodiment. In FIG. 6A, it can be seen that the active pixel sensor 600 detects a dark spot 602 in the visible area 604. For purposes of detecting a finger tap, the position of this dark spot 602 is not strictly relevant. As long as enough of the active pixel sensor 600 is dark, it can be assumed that the user's finger is covering the active pixel sensor 600. Thus, it can be assumed that the user's finger may be in the position indicated in FIG. 6B.

Figure 6C:
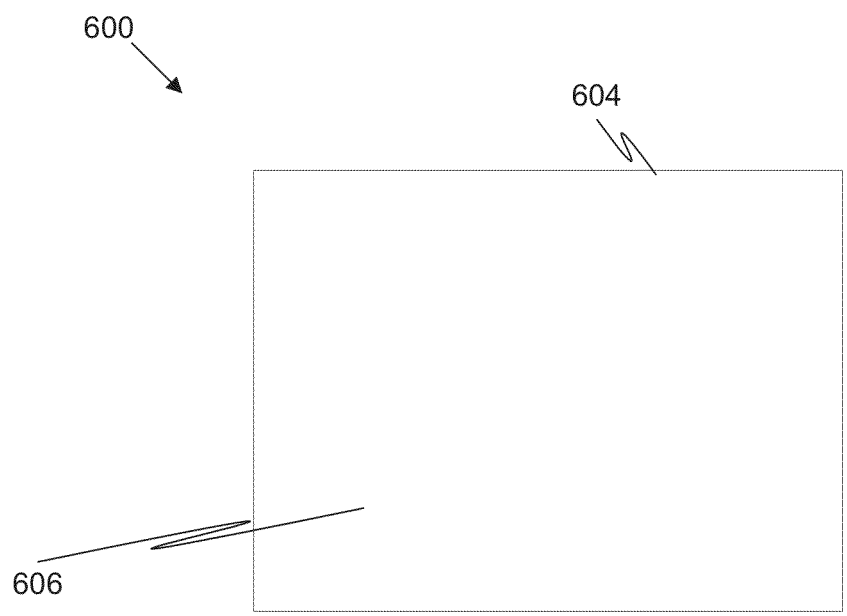
Figure 6D:
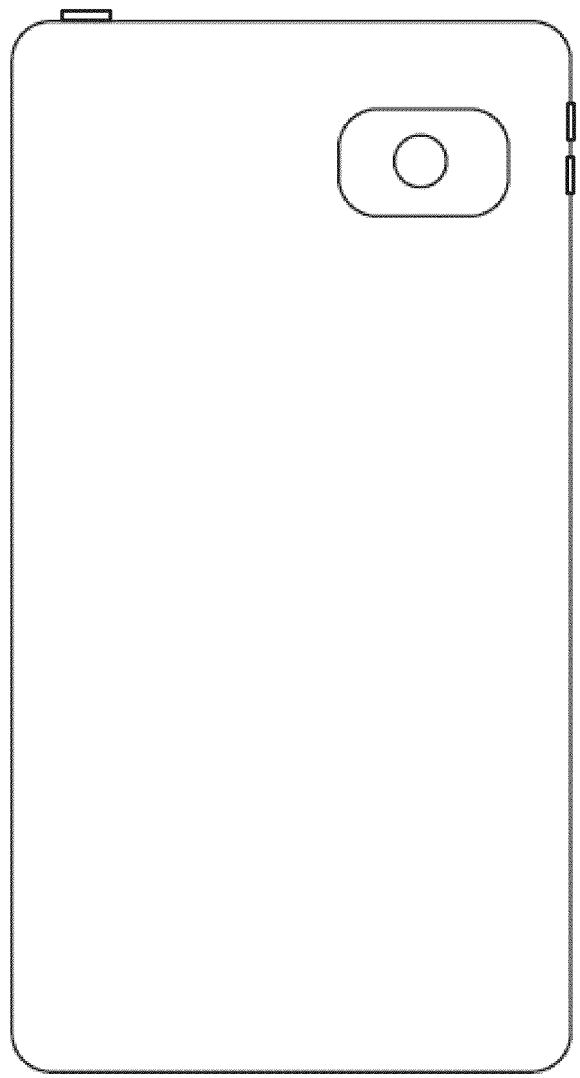

In FIG. 6C, it can be seen that the active pixel sensor 600 detects a large light spot 606 in the visible area 604. This may indicate that the user's finger is no longer covering the active pixel sensor 600, as depicted in FIG. 6D. It should be noted that in some embodiments, thresholds may be used to determine exactly how much of a dark spot 602 is needed in order for the system to register that the user's finger is covering the active pixel sensor 600, and how much of a light spot is necessary in order for the system to register that the user's finger is no longer covering the active pixel sensor 600 (or at least has been removed enough for purposes of detecting an eventual "tap," since every tap has both a covering and uncovering component). These thresholds may be different. For example, in some example embodiments, the system registers that the user's finger is covering the active pixel sensor 600 if at least 60% of the visible area of the active pixel sensor 600 is dark, whereas the system registers that the user's finger has been lifted if no more than 5% of the visible area of the active pixel sensor 600 is dark.

Figure 6E:
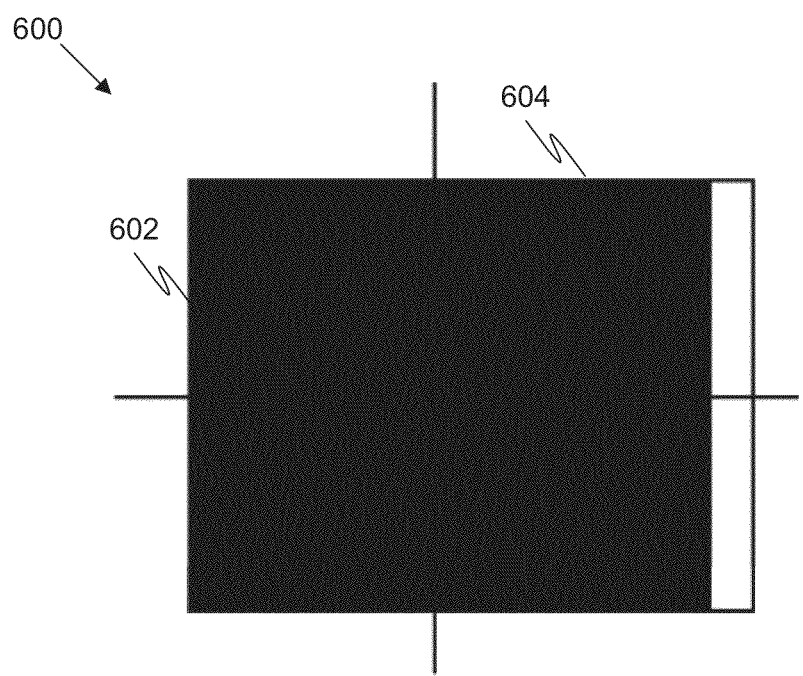
Figure 6F:
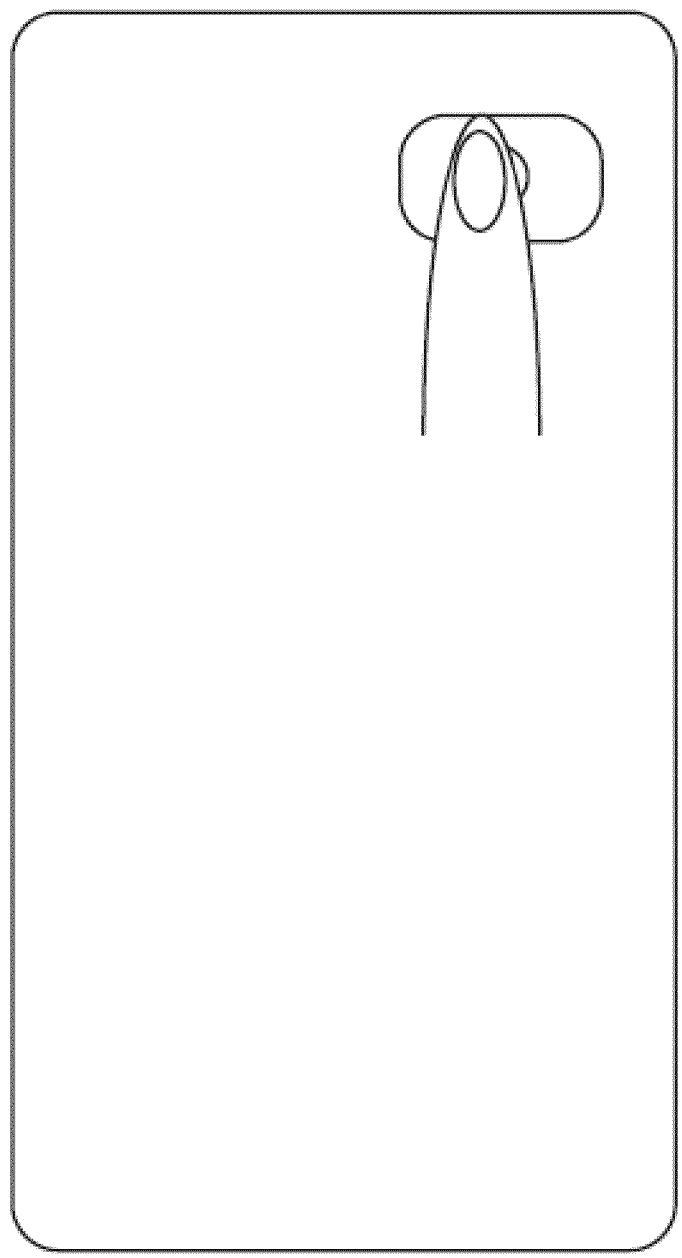

In FIG. 6E, it can be seen that the active pixel sensor 600 detects a dark spot 602 in the visible area 604. Thus, the system can assume again that the user's finger is over the active pixel sensor 600, as depicted in FIG. 6F. It should be noted that it is not necessary that the dark spot 602 match the dark spot 602 from FIG. 6A, in either size or position. Indeed, it would be pretty rare that the user would hit the exact same position on the active pixel sensor 600 twice in a row with his finger. It is enough that the threshold for detecting a finger has been reached twice.

While the above description involves detection of a single tap, multiple tap combinations could be detected in a similar manner. Indeed, there may be a variety of different finger movements and gestures that may be detected using the above techniques. For example, different patterns of dark to light transitions as well as timing between the transitions may trigger different functions within an application.

Figure 7:
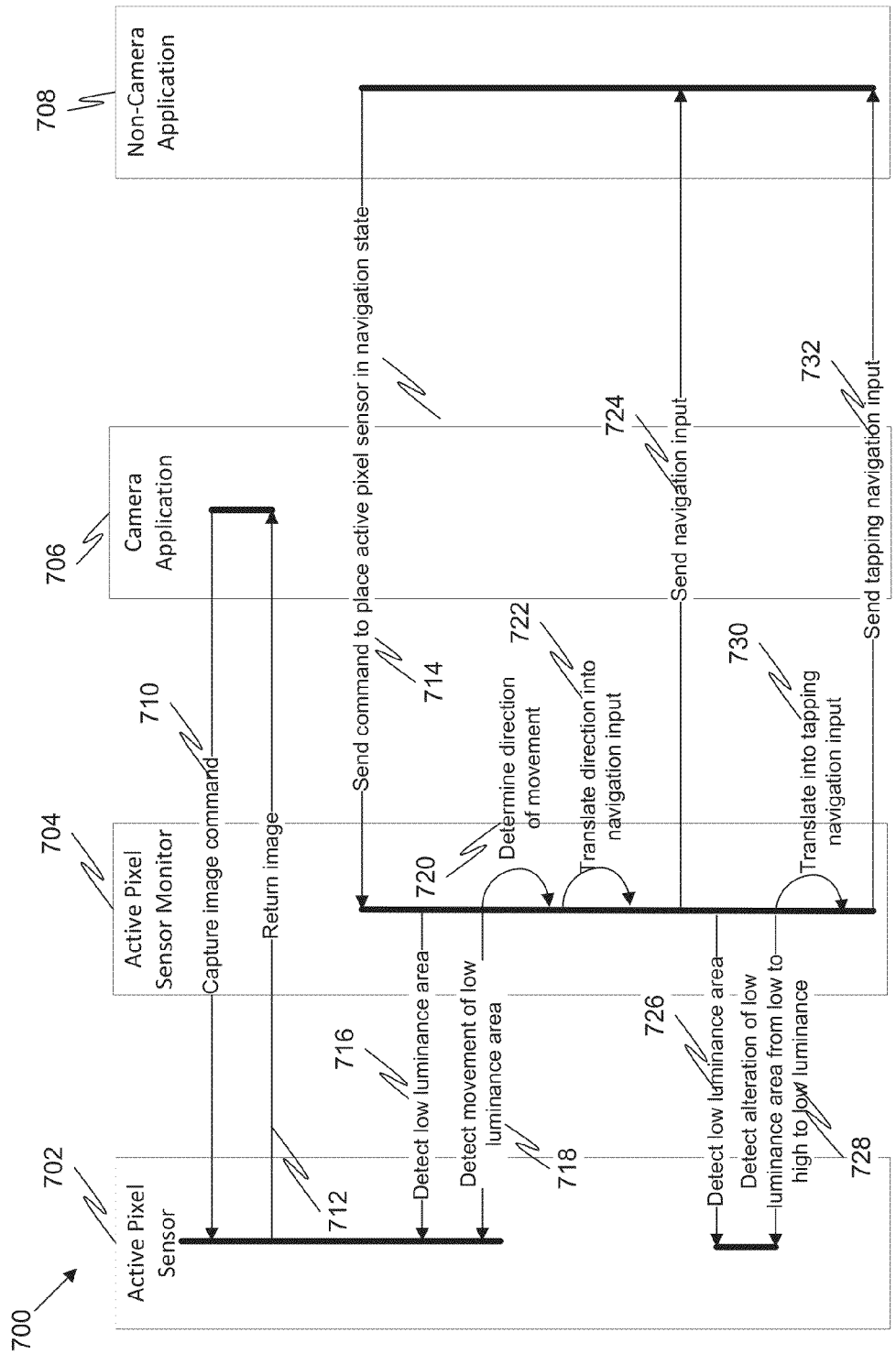
FIG. 7 is an interaction diagram illustrating a method for navigating on a user device using an active pixel sensor located on the user device in accordance with an example embodiment.

FIG. 7 is an interaction diagram illustrating a method 700 for navigating on a user device 200 using an active pixel sensor 702 located on the user device 200 in accordance with an example embodiment. The components depicted in this diagram may all be located on the user device 200. The method 700 includes an active pixel sensor 702, which is depicted as being separate from an active pixel sensor monitor 704. The active pixel sensor monitor 704 can act to monitor changes in luminance in the active pixel sensor 702. While these components are depicted as separate in this figure, one of ordinary skill in the art will recognize that the active pixel sensor monitor 704 may simply be considered part of the active pixel sensor 702. A camera application 706 is any application that operates the active pixel sensor 702 as a camera. A non-camera application 708 is any application that does not operate the active pixel sensor 702 as a camera. In certain examples, the discussed functions can be incorporated into the operating system of the user device. In these examples, the operating system can provide applications an interface to operate a camera as a camera or as a navigation-based input device, according to the methods discussed herein.

At 710, the camera application sends a command to the active pixel sensor 702 to capture an image. At 712, this image is returned by the active pixel sensor 702 to the camera application 706. Of course, this process may be repeated many times in the case of a video, where a series of still images are captured by the active pixel sensor 702 and sent to the camera application 706 (along with audio information from a separate microphone).

At 714, the non-camera application sends a command to the active pixel sensor monitor 704 requesting that the active pixel sensor 702 be placed in a navigation state. In this navigation state, rather than capturing images like a camera, the active pixel sensor 702 will be utilized to detect navigation movements. At 716, the active pixel sensor monitor 704 detects an area of the active pixel sensor 702 that is capturing low luminance. This may be an area that has luminance values less than a predetermined luminance threshold and having a size greater than or equal to a size threshold. The size threshold may be expressed in, for example, a number of pixels, or a percentage of the overall visible area of the active pixel sensor 702.

At 718, the active pixel sensor monitor 704 detects movement of the low luminance area in the active pixel sensor 702. At 720, the active pixel sensor monitor 704 determines a direction for the movement of the low luminance area. At 722, this direction is translated into navigation input. At 724, the active pixel sensor monitor 704 sends the translated navigation input to the non-camera application 708. In some example embodiments, the active pixel sensor monitor 704 may further determine a distance of movement of the low luminance area and use the distance of movement when performing the translating. This provides not just movement direction, but movement intensity, allowing a navigation input to have both direction and intensity. In further example embodiments, the speed of movement may also be tracked and used in the translation.

At 726, the active pixel sensor monitor 704 detects another area of the active pixel sensor 702 capturing low luminance. At 728, the active pixel sensor monitor 704 detects an alteration in this detected area such that the detected area changes from low luminance to high luminance and then back to low luminance within a predetermined time period. At 730, navigation input is generated indicating the detection of a tapping motion. At 732, this navigation input is sent to the non camera application 708.

Figure 8:
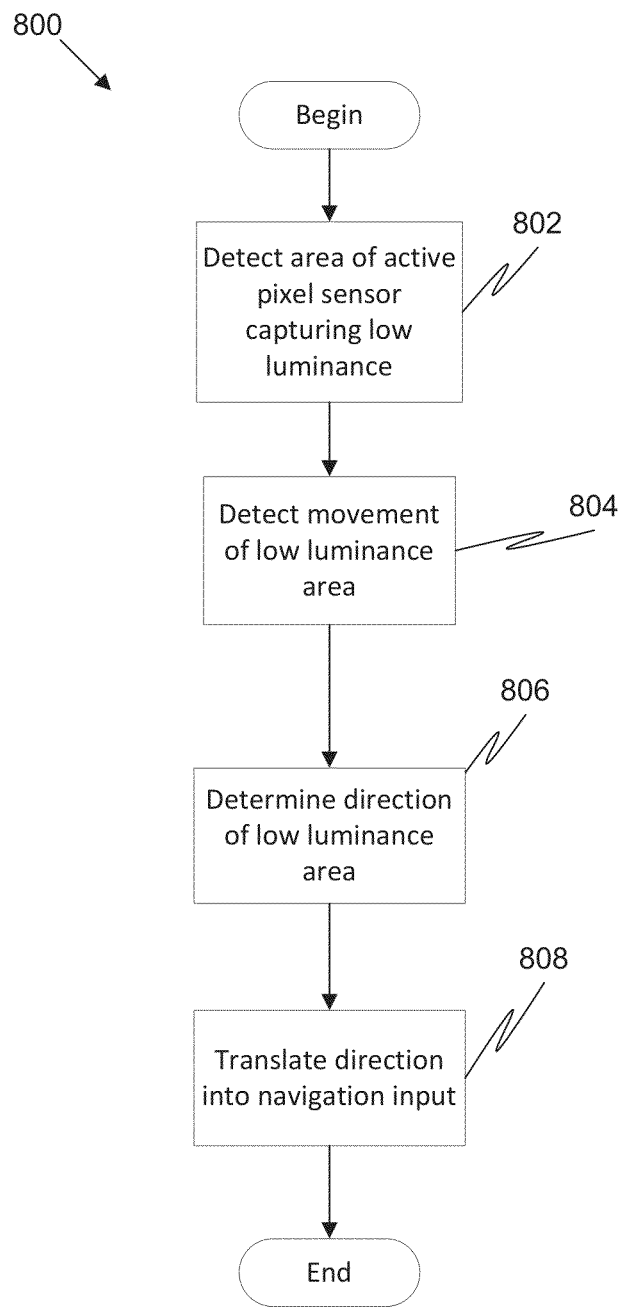
FIG. 8 is a flow diagram illustrating a method for navigating on a user device using an active pixel sensor located on the user device in accordance with an example embodiment.

FIG. 8 is a flow diagram illustrating a method 800 for navigating on a user device 200 using an active pixel sensor 702 located on the user device 200 in accordance with an example embodiment. At 802, an area of the active pixel sensor 702 capturing low luminance is detected. At 804, movement of the low luminance area is detected. At 806, a direction for the movement of the low luminance area is determined. At 808, the direction is translated into navigation input for an application running on the user device 200.

Figure 9:
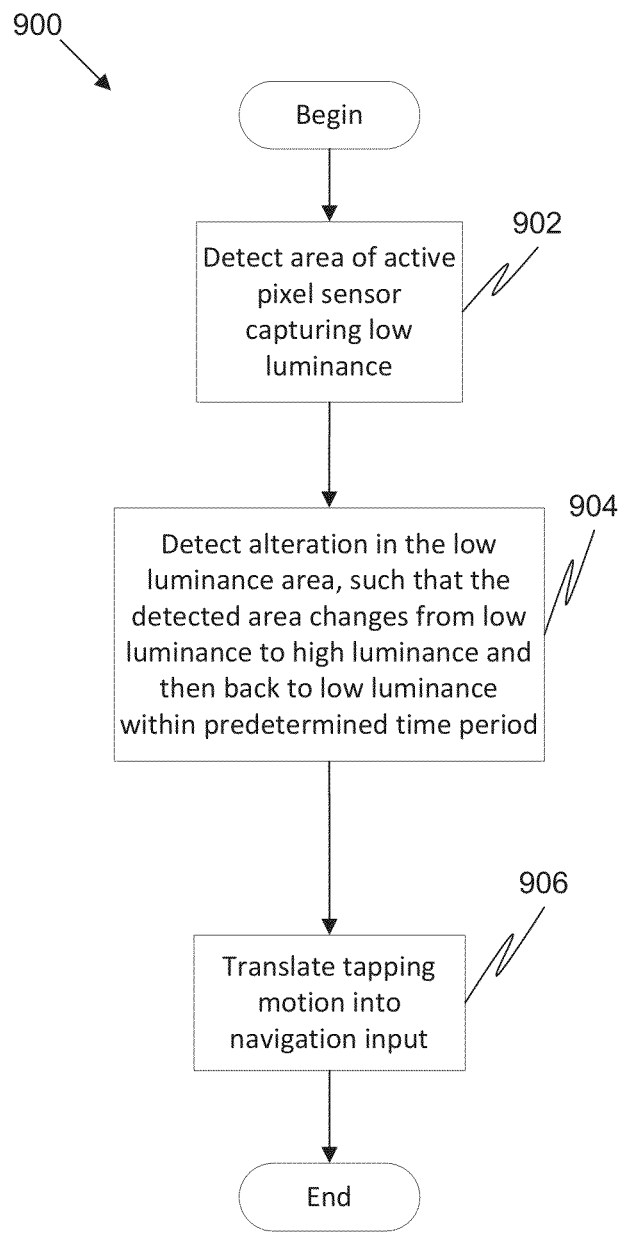
FIG. 9 is a flow diagram illustrating a method for navigating on a user device using an active pixel sensor located on the user device in accordance with an another example embodiment.

FIG. 9 is a flow diagram illustrating a method 900 for navigating on a user device 200 using an active pixel sensor 702 located on the user device 200 in accordance with an another example embodiment. At 902, an area of the active pixel sensor 702 capturing low luminance is detected. At 904, an alteration in the detected area is detected, such that the detected area changes from low luminance to high luminance and then back to low luminance within a predetermined time period. At 906, user input indicating the detection of a tapping motion is generated to an application running on the user device 200.

Figure 10:
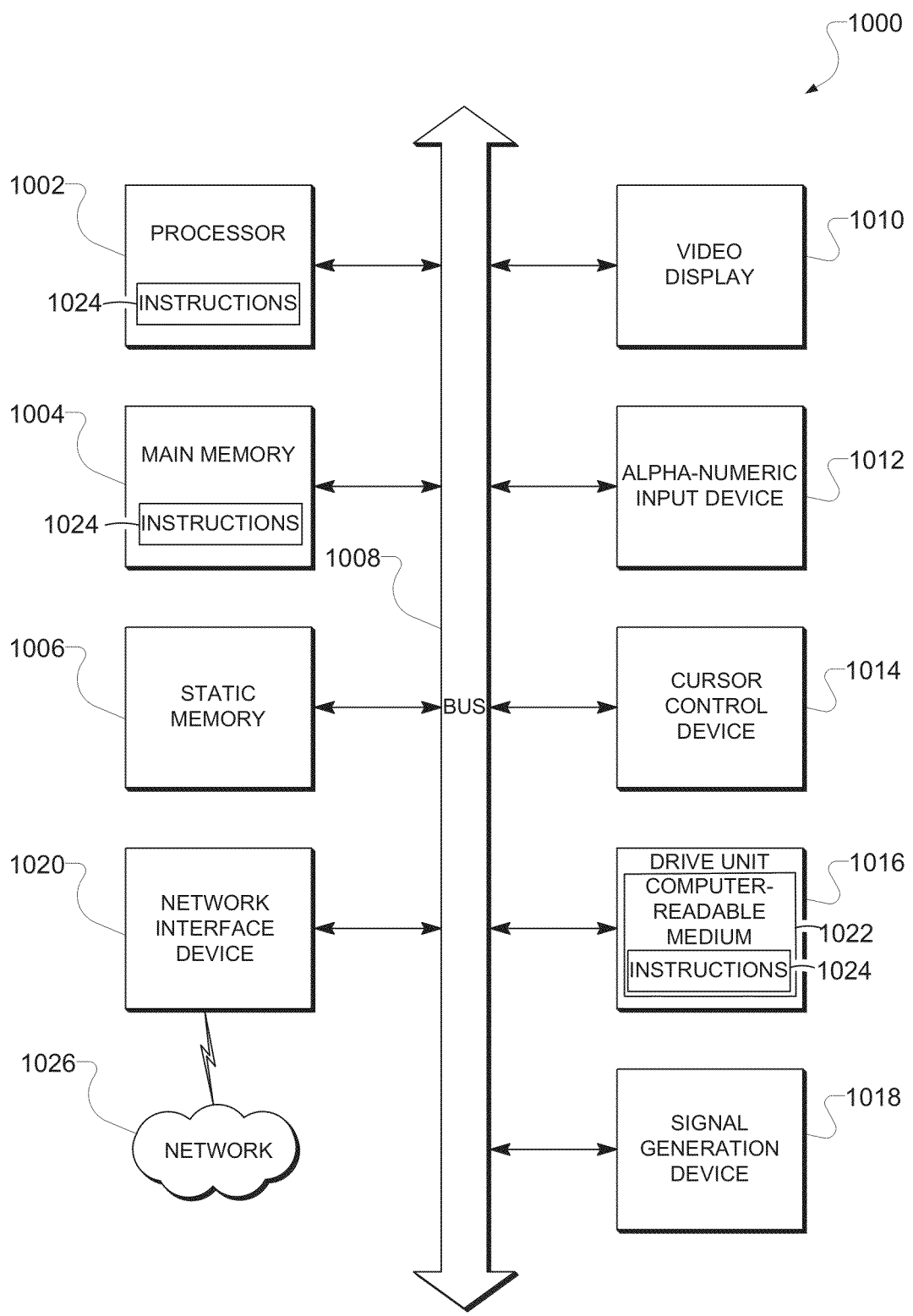
FIG. 10 shows a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker), and a network interface device 1020.

The disk drive unit 1016 includes a machine-readable medium 1022 on which is stored one or more sets of instructions (e.g., instructions 1024) embodying any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions 1024. The term "machine-readable medium" shall also be taken to include any medium that is capable of storing, encoding or carrying a set of instructions 1024 for execution by the machine and that cause the machine to perform any one or more of the methodologies described herein. The term "machine-readable medium" shall accordingly be taken to include, but not be limited to, solid-state memories, optical and magnetic media, and carrier wave signals.

Although the inventive concepts have been described with reference to specific example embodiments, it will be evident that various modifications and changes may be made to these embodiments without departing from the broader spirit and scope of the inventive concepts. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method for performing graphical user interface navigating on a user device using an active pixel sensor located on the user device, the method comprising:
   capturing a first image using an active pixel sensor, the active pixel sensor comprising a plurality of photosensors, each photosensor corresponding to a different pixel in a two-dimensional array of pixels;
   detecting a low luminance area of the first image, the low luminance area caused by an object blocking light projected by a light source outside of the user device from reaching the active pixel sensor;
   capturing a second image using the active pixel sensor;
   detecting a movement of the low luminance area between the first image and the second image;
   determining a direction based at least in part on the movement of the low luminance area; and
   translating the direction into an input for an application running on the user device.

2. The method of claim 1, further comprising:
   determining a distance based at least in part on the movement of the low luminance area; and
   using the distance when translating the direction into the input for the application running on the user device.

3. The method of claim 1, wherein the application running on the user device is not an application designed to capture images from the active pixel sensor.

4. The method of claim 1, wherein the active pixel sensor is located on a front side of the user device.

5. The method of claim 1, wherein the active pixel sensor is located on a back side of the user device.

6. The method of claim 1, wherein the detecting the low luminance area includes locating an area having luminance values less than a predetermined luminance threshold and having a size greater than or equal to a size threshold.

7. A method for performing graphical user interface navigating on a user device using an active pixel sensor located on the user device, comprising:
   capturing a first image using the active pixel sensor, the active pixel sensor comprising a plurality of photosensors, each photosensor corresponding to a different pixel in a two-dimensional array of pixels;
   detecting an area of the first image having low luminance, the low luminance area caused by an object blocking light projected by a light source outside of the user device from reaching the active pixel sensor;
   capturing a second image using the active pixel sensor;
   capturing a third image using the active pixel sensor;
   detecting an alteration in the detected area among the first image, the second image, and the third image such that the detected area changes from low luminance in the first image to high luminance in the second image and then back to low luminance in the third image and the first, second, and third images are captured within a predetermined time period of each other; and
   generating navigation input to an application running on the user device based at least in part on detecting the alteration in the detected area, the navigation input indicating detection of a tapping motion.

8. The method of claim 7, further comprising:
   further detecting an additional alteration in a detected area such that the detected area changes again from low luminance to high luminance and then back to low luminance within the predetermined time period; and
   generating navigation input to the application, the navigation input indicating the detection of a double tapping motion.

9. The method of claim 7, wherein the user device has no physical buttons capable of providing navigation input to the application.

10. A user device comprising:
    a processor;
    memory;
    a touchscreen;
    an active pixel sensor located opposite the touchscreen and configured to act as a camera while a camera application is executing by the processor, and configured to act as an input device while a non-camera application is executing by the process, the active pixel sensor comprising a plurality of photosensors, each photosensor corresponding to a different pixel in a two-dimensional array of pixels and further configured to capture a first image and a second image; and an active pixel sensory monitor configured to:
  detect a low luminance area of the first image, the low luminance area caused by an object blocking light projected by a light source outside of the user device from reaching the active pixel sensor;
  detect movement of the low luminance area between the first image and the second image;
  determine a direction for the movement of the low luminance area; and
  translate the direction into navigation input for an application running on the user device.

11. The user device of claim 10, wherein the active pixel sensor is located on a front of the user device.

12. The user device of claim 10, wherein the active pixel sensor is located on a back of the user device.

13. The user device of claim 12, wherein translating the direction includes generating a navigation input in a direction opposite from the direction determined for the movement of the low luminance area.

14. The user device of claim 10, wherein the user device is a smartphone.

15. The user device of claim 10, wherein the user device is a tablet computer.

16. A user device having a front and a back, comprising:
  a processor;
  memory;
  a touchscreen located on the front of the user device;
  an active pixel sensor configured to act as a camera while a camera application is executing by the processor, and configured to act as an input device while a non-camera application is executing by the process, the active pixel sensor comprising a plurality of photosensors, each photosensor corresponding to a different pixel in a two-dimensional array of pixels and further configured to capture a first image, a second image, and a third image; and
  an active pixel sensor monitor configured to:
    detect an area of the first image having low luminance, the low luminance area caused by an object blocking light projected by a light source outside of the user device from reaching the active pixel sensor;
    detect an alteration in the detected area among the first image, the second image, and the third image such that the detected area changes from low luminance in the first image to high luminance in the second image and then back to low luminance in the third image, wherein the first image, the second image, and the third image were captured within a predetermined time period of each other; and
    generate navigation input to an application running on the user device, the navigation input indicating detection of a tapping motion.

17. The user device of claim 16, wherein the user device lacks a button dedicated to receiving a user indication of a selection of an item displayed on the touchscreen.

18. The user device of claim 16, wherein the active pixel sensors is one of two identical active pixel sensors on the user device.

19. A non-transitory machine-readable storage medium including instructions that, when executed by a machine, cause the machine to perform operations comprising: selecting a user input mode for data received from an active pixel sensor; receiving sensor data from the active pixel sensor, the active pixel sensor comprising a plurality of photosensors, each photosensor corresponding to a different pixel in a two-dimensional array of pixels; parsing, over a period of time, received sensor data into a plurality of input events; and generating input to an application running on the machine based at least in part on the plurality of input events, wherein the plurality of input events include movement of a low luminance area, the low luminance area caused by an object blocking light projected by a light source outside of the user device from reaching the active pixel sensor.

20. The non-transitory machine-readable storage medium of claim 19, wherein the plurality of input events include a series of light to dark transitions indicating a tapping motion.

* * * * *